June 14, 1960
H. KARLBY
2,940,309
FLOW MASS METER
Filed May 4, 1954
4 Sheets-Sheet 1
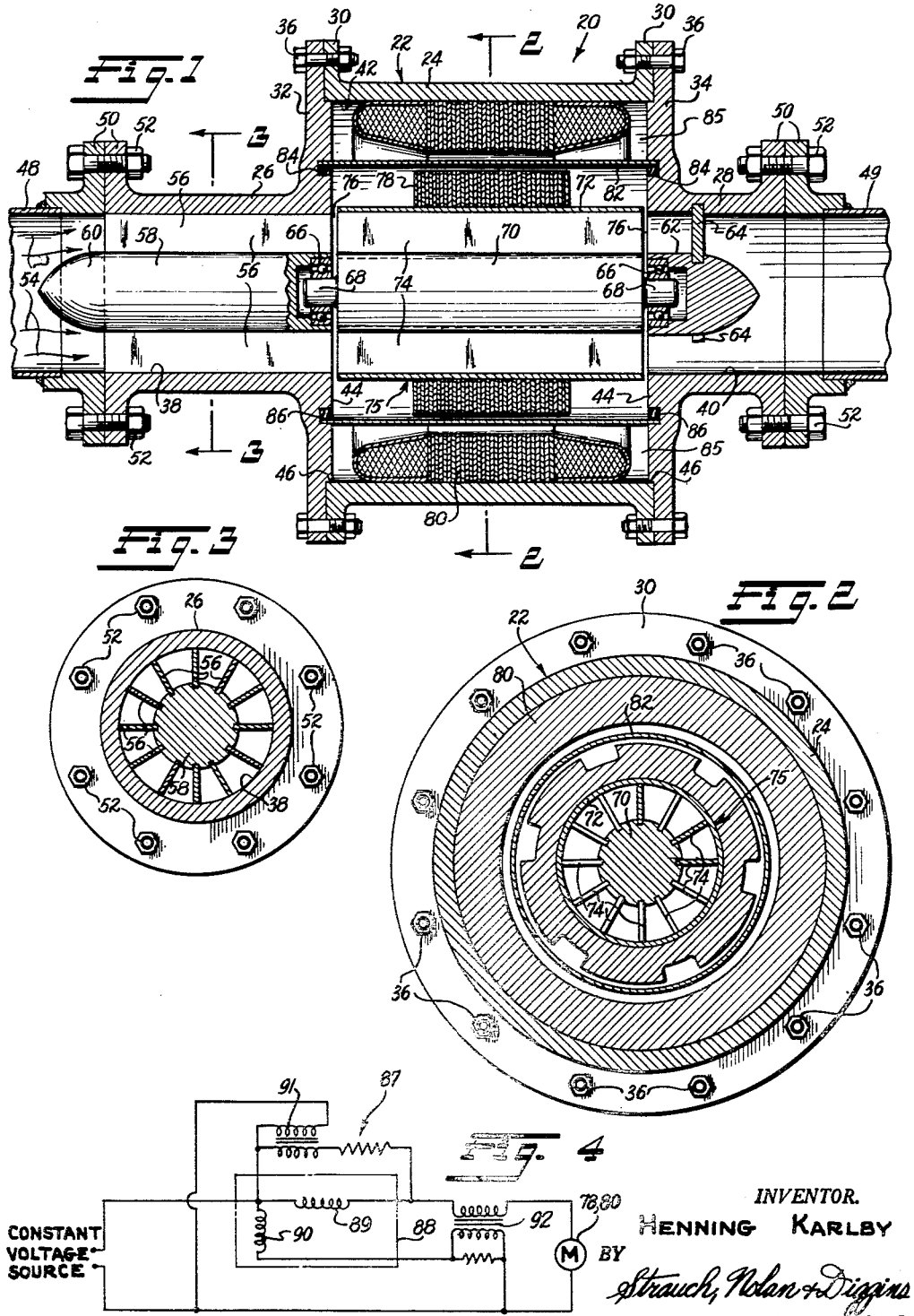
INVENTOR.
HENNING KARLBY
BY
Strauch, Nolan + Diggins
ATTORNEYS

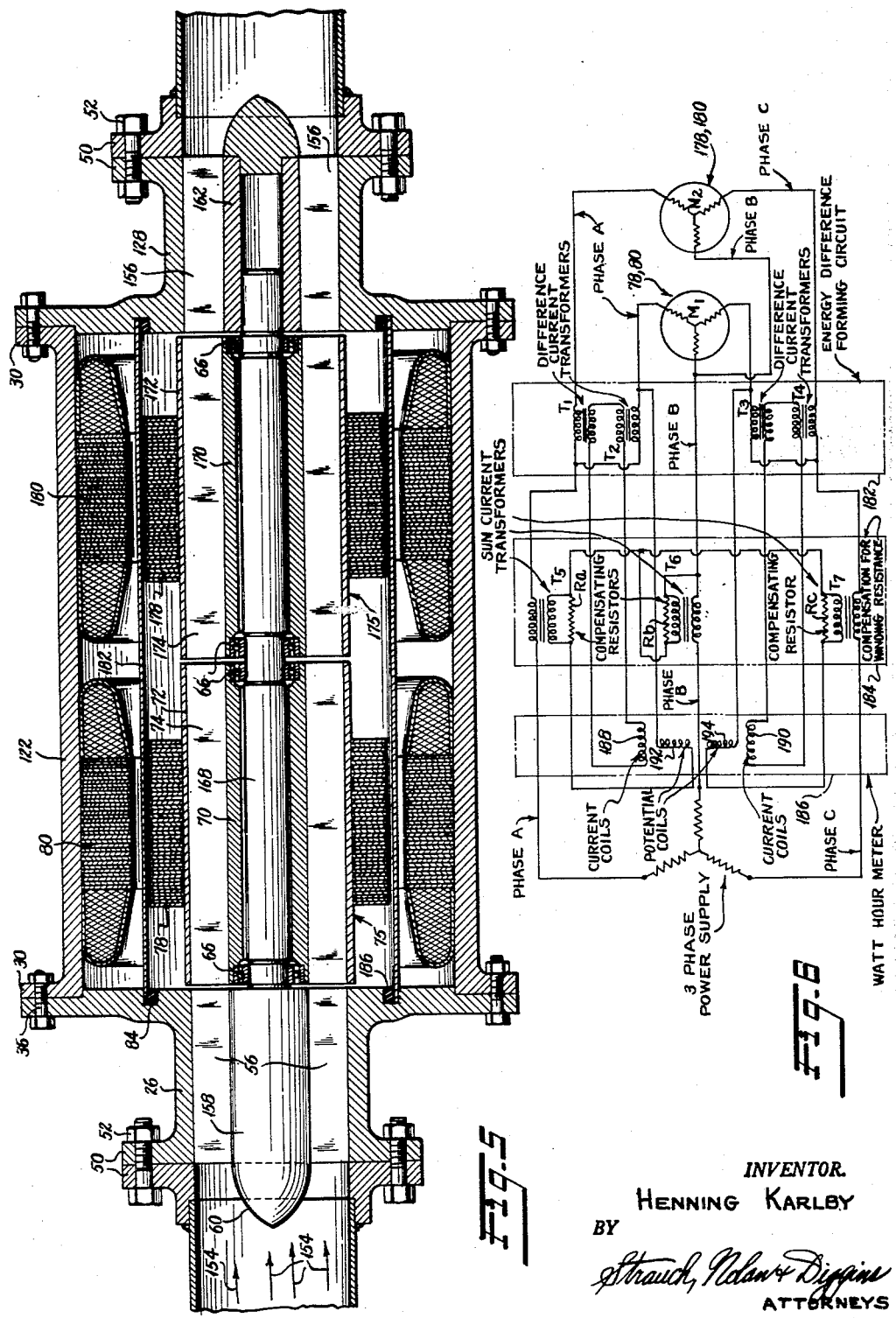

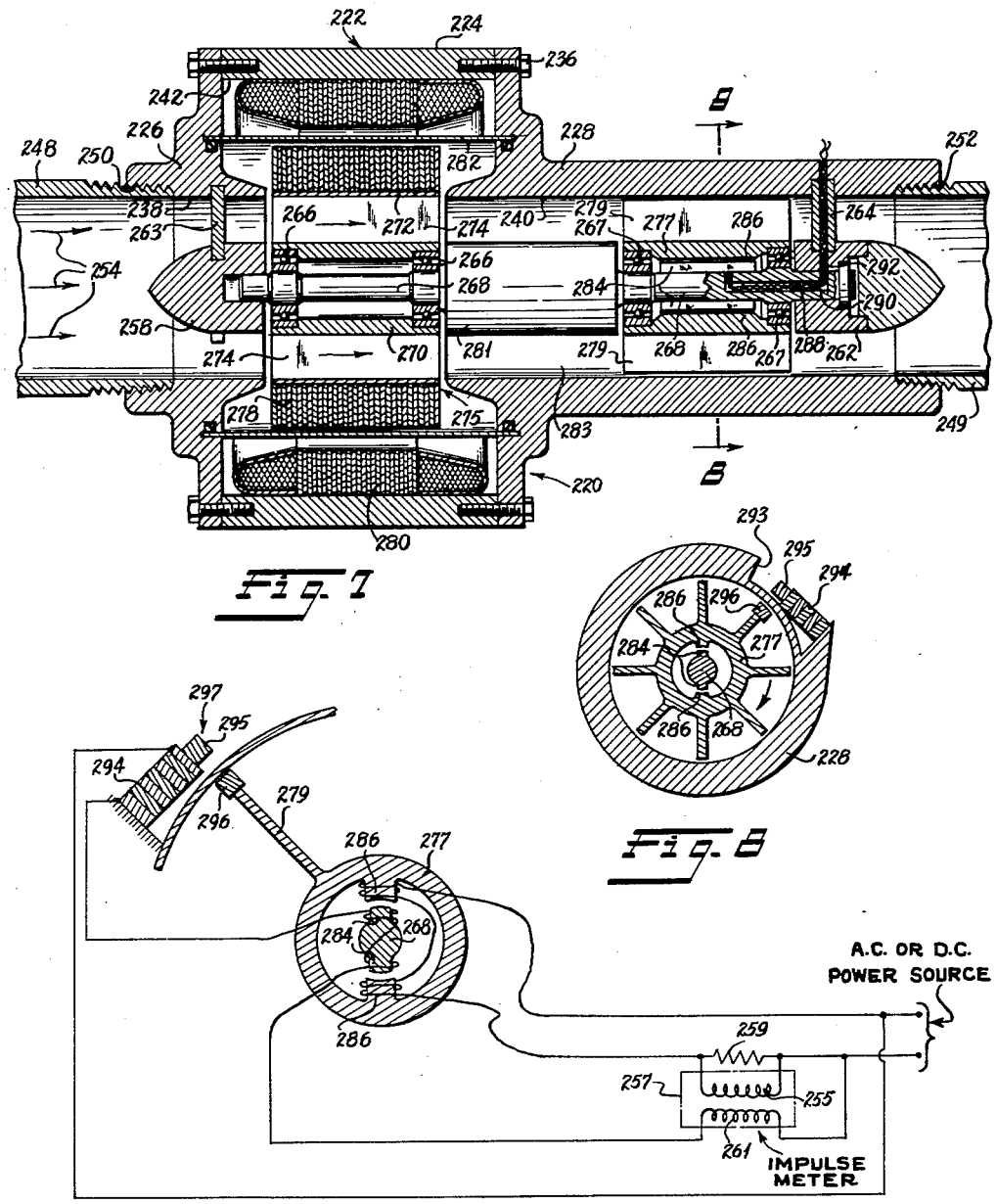

June 14, 1960     H. KARLBY     2,940,309
FLOW MASS METER
Filed May 4, 1954     4 Sheets-Sheet 4
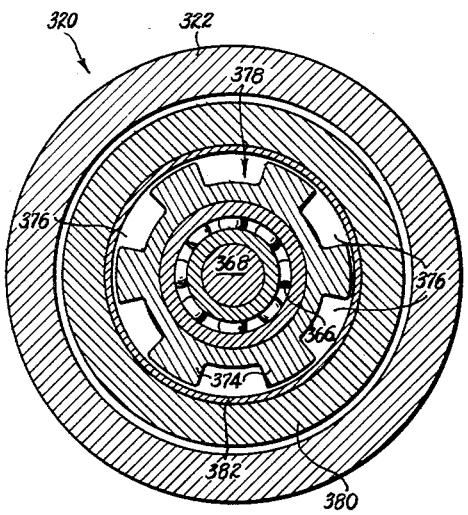
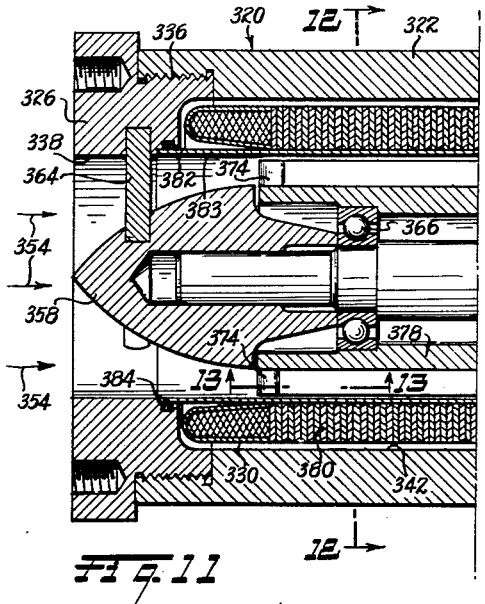
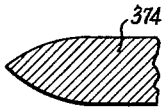
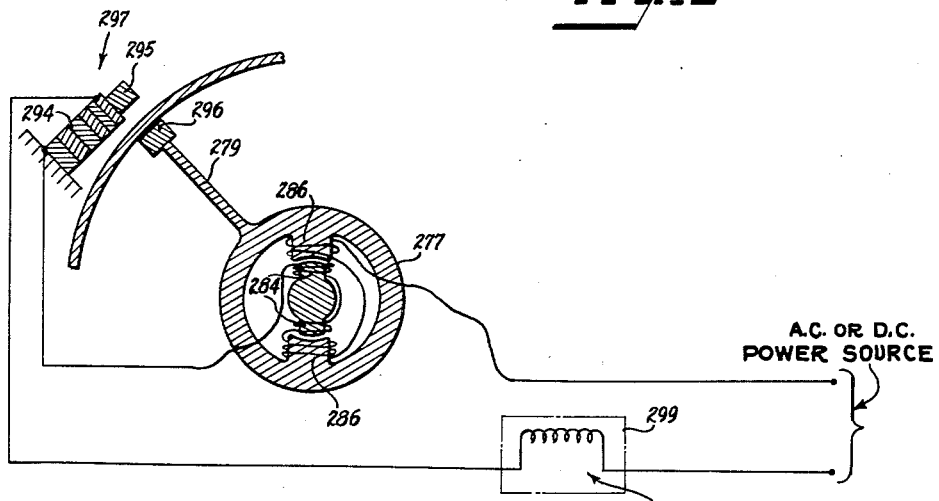
INVENTOR
HENNING KARLBY
BY *Strauch, Nolan + Diggins*
ATTORNEYS

2,940,309
FLOW MASS METER

Henning Karlby, Pittsburgh, Pa., assignor to Rockwell Manufacturing Company, Pittsburgh, Pa., a corporation of Pennsylvania Filed May 4, 1954, Ser. No. 427,558

9 Claims. (Cl. 73—194)

This invention relates to mass metering devices and particularly to apparatus for measuring the flow of fluids in terms of weight or mass units.

At the present time, the vast majority of commercial fluid flow measuring devices in use are of the volume-meter type, that is, wherein flow is measured and indicated entirely in terms of volume or is measured fundamentally on the basis of volumetric units and converted to mass units by calibration or compensation of the apparatus for the variables, as for example, temperature and pressure affecting density, or by conversion of volumetric meter readings to mass units by subsequent calculations.

It is well known that volume is far from an ideal basis for accurate measurement because it is variable, being a function of density which in turn depends on ambient temperature and pressure conditions. Thus, for example, when fluids are bought and sold for combustion, e.g., fuel oil, gasoline, kerosene, etc., the heat content is the significant value and this is a function of mass rather than volume. Therefore, when a consumer purchases such fluids by the gallon or like volumetric units, the mass of fluid and, therefore, the heating value obtained in a given volume depends on the temperature and pressure conditions existing at the time of purchase.

An important example of inadequacy of volumetric meters occurs in the measurement of multi-phase fluids such as the "liquified petroleum gases" (L.P.G.) (propane, butane, etc.) which fluctuate between their liquid and gaseous phases and therefore, in density, with relatively small changes in temperature and pressure, making it difficult or impossible to determine or control the phase of the fluid during the metering. As a result, volume measurements of such fluids are frequently inadequate, when used to indicate the actual amount (mass) of substance present.

Since mass is a direct function of volume and density, i.e., mass $(m)$=volume $(v) \times$density $(\rho)$, and density varies with temperature and pressure, in order to obtain accurate flow measurement with a volumetric meter it is necessary to determine temperature and pressure of the fluid at the time of metering and to correct to standard conditions. As the art of fluid measurement progressed, "compensated" instruments were developed which automatically and continuously measure and correct for temperature and pressure conditions. These devices, however, are inherently complex and because of their complexity are expensive and delicate. As a result, their use has often been limited primarily to scientific applications and such industrial purposes as the nature of the installation and fluids handled required and/or permit.

Aside from the disadvantages of even the compensated volumetric meters mentioned above, all known volume meters, compensated or not, have the distinct additional shortcoming that they give accurate readings only when the fluid being measured is of a completely homogeneous character and therefore are wholly unsuited to handle the heterogeneous fluids, e.g., fluids containing transient solids, which constitute a large proportion of the fluids encountered in commerce and industry.

Because of the many shortcomings of volume meters, much research in recent years has been directed toward the development of a commercially practical device for accurately measuring fluid flow on the basis of mass rather than volume. Various physical principles have been resorted to and attempts made to devise mechanical structures for utilizing them but to date all such meters developed have been mass rate meters and no satisfactory mass meter has been developed for the required accurate measurement of relatively costly commercially-marketed fluids such as the petroleum products distributed through pipe lines in large volume.

For example, United States Letters Patent No. 2,591,478 to Turner discloses a mass rate meter utilizing aerodynamic principles. In the Turner meter a small number of airfoils are mounted in radial-axial planes about a shaft coaxially disposed in a flow conduit so that their planes of aerodynamic symmetry are parallel to the flow to avoid aerodynamic "lift" on them at any rate of flow when they are stationary. In operation, the airfoils are rotated at constant angular velocity, as by a constant speed electric motor, and are spaced circumferentially far enough apart to act essentially independently or without relative aerodynamic interference so that, in turning, the airfoils impart tangential velocity to part of the fluid and the remainder passes the airfoils without deviation. The angular momentum imparted to the fluid by the airfoils per unit time results in shaft torque which is used to indicate the mass rate of flow across the meter. Inasmuch as it is impossible to establish directly the relation between rate of change of angular momentum and total mass rate through this type of meter because the mass of fluid deviated is not known, recourse is had to experimental aerodynamics where "lift" and "drag" values are measured as functions of "angle of attack," for a specific airfoil essentially of "infinite length." The basic assumption is that the effective or "induced" angle of attack of the blades and, therefore, the lift exerted thereon is a function of flow velocity through the conduit, and that because the airfoils are rotating at a constant speed, the induced or effective angle of attack is the resultant of the axial velocity of the fluid and the linear tangential velocity of the blades.

The accuracy asserted for this type of meter, being the difference in torque between test results and theoretical performance is within about 2.5 percent which is not sufficient when dealing with relatively expensive commercial fluids in the measurements of which accuracy within about 0.1 percent is demanded, or when dealing with critical quantities such as encountered in many chemical manufacturing processes.

Serious limitations in range and accuracy of this type of meter arise from the fact that the relation between coefficient of lift and angle of attack of any known airfoil is not exactly linear, even theoretically, and this relation is approximately linear only in the relatively narrow span of angles of attack ranging from 0 to 10 degrees. In addition while this portion of the curve is approximately linear in theory for hypothetical "infinite span" airfoils, it is well known to those familiar with experimental data on airfoil shapes obtained in standard wind tunnel tests that, in practice, due to such uncontrollable factors as flow turbulence it is practically impossible to get all test points plotted to fall on the faired theoretical line.

Summarizing then, the accuracy of an aerodynamic mass flow meter of the Turner type is limited by the allowable angle of attack of the airfoil which imposes both an upper and lower limit on the flow rate to be measured; the range of flows expected must be known in order to determine the rotational speed of the airfoils; and the meter will operate satisfactorily only on high mass rate, high velocity, homogeneous flows. The accuracy is further limited because in practice, there is inevitably some interference between the airfoils, the airfoils are not of the theoretical "infinite length," and the induced angle of attack varies along the span of the airfoils because the linear velocity of each segment of the airfoil increases with the distance from the center of rotation.

Another example of prior devices for measuring mass rate of flow of fluids is disclosed in United States Patent No. 2,602,330 to Kollsman and utilizes a centrifugal impeller which imparts a radial and tangential component to the fluid flow being measured. The impeller is peripherally enveloped in a concentric, bladed rotor on which the fluid coming from the impeller impinges and exerts a rotary force theoretically proportional to the mass rate of flow of the fluid. This type of meter involving as it does, numerous sharp changes in the direction of flow of the fluid during metering introduces substantial inaccuracy in measurement and head losses which make it wholly unsuited for industrial applications requiring that such losses be a minimum. The most important of these is the commercial measurement of fluid flows in pipe lines where increased head losses would add materially to the power required for and, therefore, the cost of moving the fluids.

Another hitherto unsolved problem which has arisen in the development of mass meters involves the manner and form in which the desired reading is obtained. The quantity of primary importance in most industrial applications, that is, where fluids are measured commercially, is the total mass of fluid flowing in a given period of time. Mass meters heretofore developed, for example the Kollsman meter mentioned above and the Orlando and Jennings meter discussed hereinbelow, are basically mass rate meters, that is, meters which measure flow fundamentally in terms of rate rather than total quantity. As a result, if total quantity measurements are required and, as already stated such measurements are more important in industrial applications than are flow rates, it becomes necessary to provide additional means for integrating or totalizing the instantaneous flow rate readings of the meter to obtain total quantities.

This integration may be accomplished in various ways known in the art but, because the basic quantity measured by prior art meters is flow rate, totalization inevitably results in introducing inaccuracies in the final measurements, due to the inherent and unavoidable inefficiency of the integrating systems which must be employed.

For example, in certain forms of the Kollsman type meter, meter output is measured in terms of the deflection of a spring which restrains the "rotor" or reaction member from rotation. The deflection at any given instant reflects the instantaneous mass flow rate. This immediately introduces an error proportional to the deviation of the spring from a completely linear force response. Furthermore, since the energy output of the meter is thus destroyed, energy to operate a totalizer has to be produced as an analog or in proportion to the deflection or angular position of the restrained reaction member. A signal thus produced is by nature weak and would, therefore, require several stages of amplification subject to all the inherent errors of such a process.

In another form of the Kollsman type meter, integration is accomplished by use of a mechanical, revolution-type counter, driven by the reaction member. This system is likewise unsatisfactory because of variable friction and drag on the counter and reactor introduce unknown errors in the reading.

Another type mass rate flowmeter is shown in an article entitled "Mass Flowmeter" by Orlando and Jennings published in "Mechanical Engineering" magazine, November 1953, pages 900–901.

As in the Kollsman type meter, the meter output is destroyed by a restraining spring and the deflection of a pointer indicates instantaneous mass rate which must then be totalized to obtain total mass with the same inherent problems and difficulties encountered in the Kollsman meter. From the foregoing discussion, it will be appreciated that prior art mass meters are basically rate meters and their adaption to measure total mass inevitably results in increasing the inaccuracies already inherent therein because of the manner of handling the fluid and/or the manner in which final readings are obtained.

The present invention provides flow mass meters which measure flow directly in terms of total mass quantity although, with modifications, mass rate measurements may also be obtained, and which are sufficiently accurate to replace volumetric meters in the commercial measurement of pipe line flows and the like.

In its broadest aspect, the invention contemplates novel meters for flowing substances which measure mass by giving the (unknown) mass ($m$) a defined and constant velocity $V$ whereby the mass then possesses a kinetic energy $$\frac{(mV^2)}{2}$$

and momentum ($mV$) and then measuring either quantity in proper units to obtain a direct measure of the mass passed by the meter. Exemplary embodiments of each type of meter, that is, the kinetic energy and the momentum types, are hereinafter described with particularity.

Accordingly, it is a fundamental object of the invention to provide novel, highly accurate, flow mass meters suitable for commercial large volume fluid flow measurements.

A further object of the invention is to provide improved, highly accurate flow mass meters whereby the total mass flow of a fluid in a conduit may be accurately measured.

A still further object of the invention is the provision of improved, relatively large capacity flow mass meters certain forms of which operate on the principle of conservation of momentum and other forms of which operate on the principle of conservation of energy and all forms of which are insensitive to such factors as the viscosity, pressure, density, and degree of homogeneity of the fluids handled.

Another object is the provision of novel flow mass meters in which a predetermined angular velocity is imparted to each particle of a transient body of fluid and the kinetic energy or momentum of the fluid is so measured as to accurately indicate the total mass of fluid passed by the meter.

Still another object of the invention in one form is to provide a novel flow meter operating on the principle of conservation of energy wherein a predetermined angular velocity is imparted to a flowing fluid mass in a first stage and maintained in a second stage and the difference in energy required by the first and second stages is measured to indicate flow mass, thus eliminating the effects of energy losses on the measurements.

A further object of the invention is to provide another form of novel flow meter operating on the conservation of momentum principle wherein a predetermined angular velocity is imparted to a transient body of fluid and the momentum then possessed by the fluid is measured by reducing the angular velocity to zero and metering the momentum required for the deceleration which momentum is a direct measure of mass flow.

A still further object of the invention is to provide improved, highly accurate mass-rate flow meters wherein total mass flow of fluid is measured directly in terms of the magnitude of an electrical quantity required to effect a known change in the momentum or kinetic energy of all particles of a fluid substance flowing past a given station in a given period of time.

Another object of the invention resides in the provision of flow mass meters which are simple, rugged and compact in construction, highly accurate in operation, and which offer a minimum amount of obstruction to flow in the conduit in which they are installed.

These and other subordinate objects of the invention will become apparent to those conversant with the art from a reading of the following description and subjoined claims in conjunction with the appended drawings in which:

Figure 1 is an axial section through a basic form of improved flow mass meter according to the present invention;

Figures 2 and 3 are cross sections on lines 2—2 and 3—3 respectively of Figure 1;

Figure 4 is a schematic wiring diagram of the electrical circuit of the meter shown in Figure 1;

Figure 5 is an axial section similar to Figure 1 showing a form of energy type flow mass meter contemplated by the invention;

Figure 6 is a schematic wiring diagram of the electrical circuit of the meter shown in Figure 5;

Figure 7 is an axial section similar to Figures 1 and 5 of a form of momentum type of flow mass meter contemplated by the invention;

Figure 8 is a cross-section taken on line 8—8 of Figure 7 showing a variable impedance position indicator for the momentum type flow mass meter;

Figures 9 and 10 are enlarged fragments of Figure 8 showing schematically the wiring diagram of alternative forms of the electrical circuit of the meter shown in Figure 7;

Figure 11 is a partial longitudinal sectional view similar to Figures 1, 5 and 7 showing a modified form of construction applicable to all meter embodiments disclosed;

Figure 12 is a sectional view on line 12—12 of Figure 11; and

Figure 13 is a sectional view on line 13—13 of Figure 11.

Before undertaking a complete detailed description of certain preferred physical embodiments of the present invention, the general concepts and principles of operation applicable to all forms of the invention will be described.

As previously explained, the present invention contemplates structure for utilizing the law of conservation of momentum and the law of conservation of energy to measure mass flow of fluids. The law of conservation of momentum prescribes a unique relation between the impulse applied and the change of momentum induced, which change is in no way dependent upon the losses. Applied to fluid measurements, the amount of impulse required to produce a given change (increase or decrease) in the momentum of a moving fluid is directly proportional to the flow mass, independent of losses, and moreover is a physical quantity which can be accurately measured.

Similarly, the law of conservation of energy holds for any real process of fluid flow which involves inevitable losses, but in this case, these losses occurring in change of energy from one form to another must be considered in order to accurately measure mass flow.

*Basic principles*

As is well known in the physical sciences, momentum and kinetic energy are closely related concepts in that both are concerned with the relationship of mass ($m$) and the motion or velocity ($V$) of the mass. Thus, while momentum is mathematically defined $mV$, namely the product of mass and velocity, and kinetic energy as $$\frac{mV^2}{2}$$

that is, one half the product of the mass and the velocity squared, it will readily be seen that both concepts are inextricably related to velocity. Thus, a known mass having a known velocity has a fixed and determinable momentum and kinetic energy. Likewise, a change in the velocity is reflected in corresponding changes in both values.

From the foregoing discussion, it will be appreciated that, if the value for V is known and the value for $$\frac{mV^2}{2}$$

or $mV$ is known, the unknown value ($m$) or mass is readily determinable. Thus, restating the principle of operation applicable to both kinetic energy and momentum type meters contemplated by the invention, since mass is the quantity that is sought to be measured, if this mass is given a known velocity and the kinetic energy or momentum of the mass is measured, this is also a direct measure of the mass. This is the common underlying principle of flow-mass meters according to the present invention, exemplary structural embodiments of each type being hereinafter disclosed with particularity.

From the above it will be understood that flow mass meters according to this invention include as essential basic operational characteristics, means for establishing a condition of known and invariable velocity at some stage of passage of the fluid mass through the meter and means for determining either the kinetic energy or momentum of said mass in said stage.

Considering these operational characteristics individually and in the order mentioned, the means for establishing a condition of known and constant velocity will now be discussed.

*Establishing known and constant velocity*

In practically all cases, dealing with commercial fluids or dry material in powdered form involves handling a mass flowing in a pipe or conduit of some sort. The axial velocity of flow through the conduit is usually variable, either intentionally because of the necessity of regulating flow to meet demands, or because of uncontrollable factors such as fluctuations in viscosity, temperature, pressure head, etc. Therefore, in order to establish the requisite constant and known velocity and segregate it from the variable flow velocity it is most expedient and practical to use velocities directed perpendicularly to the flow axis.

Furthermore, as will hereinafter more fully appear, practical measurements of the momentum or kinetic energy of the fluid in order to determine its mass, entails making a change (increase or decrease) of known magnitude in the velocity of the mass or, inasmuch as velocity is a vector quantity, a change in its direction.

In order that the change in velocity be known, in the disclosed embodiments of the invention it is preferred that either the initial velocity or the final velocity be equal to zero so that the change in velocity will be equal to the initial or final velocity and will not involve actual measurement of a velocity change between two finite values.

By dealing with a tangentially directed velocity, means can be provided to insure that this velocity is zero at one stage of flow through the meter, for example, at the inlet or outlet, and is a known quantity at another stage, for example, intermediate the inlet and outlet. The various structural means for accomplishing these results are hereinafter described in detail but before considering the means for measuring momentum or kinetic energy of the fluid mass, the simplest hypothetical structure for establishing the requisite (tangential) velocity requirements will be described. This may comprise a cylindrical flow conduit containing a set of conventional straightening vanes fixed in the conduit so that passage of flow through the vanes removes all angular or tangential velocity with respect to the conduit. These vanes may be, for example, a sufficient number of flat plates of suitable length arranged in radial-axial planes having a common point of intersection coincident with the axial center of the conduit.

After passing the straightening vanes, the flowing substance (which may be gaseous, liquid or "granular" in form) may enter a set of flat blades similarly arranged in radial-axial planes downstream of the straightening vanes and mounted on a hub coaxial with the conduit and rotated about an axis coincident with that of the conduit, at a constant angular velocity. These blades must be numerous enough and/or long enough to insure that all mass elements of the fluid attain the angular velocity of the blades before leaving.

From the foregoing hypothetical structure it will be appreciated that the fluid mass leaves the straightening vanes with zero tangential velocity and leaves the rotating blades with a tangential velocity which is equal to that at the blades and is, therefore, known. Since the tangential velocity of the fluid is known, a measure of its momentum or kinetic energy is a measure of its mass. All that remains to determine the mass of fluid is to measure the kinetic energy or momentum thereof which is accomplished in the following manner.

*Measurement of momentum*

Inasmuch as the mass of fluid enters the rotating vanes with a tangential velocity equal to zero ($V_{T_1}=0$) and reaches a maximum tangential velocity ($V_{T_2}$) in the blades determined by the rotational velocity of the blades, the momentum in the tangential direction goes from $mV_{T_1}$ to $mV_{T_2}$. Since $V_{T_1}=0$ and, therefore $mV_{T_1}=0$, the change in momentum ($mV_{T_2}-mV_{T_1}$) is equal to the momentum in the tangential direction of the mass leaving the blades, that is, it equals $mV_{T_2}$. As expressed by Newton's "Second Law" of motion, rate of change in momentum is proportional to the force applied and therefore, $mV_{T_2}$ is proportional to the impulse applied by the blades. Since $V_{T_2}$ is known, measurement of the mass is effected by metering the impulse supplied to drive the blades at constant angular velocity.

Stated mathematically, $$F=\frac{d(mV_{T_2})}{dt} \quad (1)$$

where F is the force supplied by the blades and $t$ is the time. Inasmuch as we are dealing with tangentially directed forces and velocities, Equation 1 is rewritten:

$$Fr=\frac{d(m\omega r^2)}{dt} \quad (2)$$

where $\omega$ is the rotational speed of the blades in suitable units and $$\bar{r}=\sqrt{\frac{r^2+R^2}{2}} \quad (3)$$

i.e., the root mean square of the radius of the annular area of inner radius r and outer radius R or $$F\bar{r}dt=\omega\bar{r}^2 dm \quad (4)$$

In Equation 4, $\omega\bar{r}2dm$ is the change in angular momentum. The total change in angular momentum of $dm$ equals $$\int_0^m \omega\bar{r}^2 dm=\omega\bar{r}^2 m=\bar{r}\int_0^t F dt \quad (5)$$

In the embodiments of the invention disclosed hereinafter, the force F is supplied by electromagnetic means and the value of $$\bar{r}\int_0^t F dt$$

which is, in the final analysis, equivalent to the total mass of fluid passing through the meter in a given time ($t$) is measured by means of electrical devices as hereinafter fully described. From the foregoing description it is to be understood that the velocity change and, therefore, the momentum measurement may be effected both at the inlet of the meter as just described or at the outlet of the meter. In the latter case, the fluid mass would be given a known tangential velocity and, therefore would possess a momentum which is measured by reducing the tangential velocity to zero at the outlet of the meter.

The relations expressed in Equations 4 and 5 are based upon the assumption of equal distribution of mass across the annular metering section. However, since centrifugal force is exerted on the flow during passage, its effect on density distribution must be considered and, as will now be shown, is of such negligible quantity that it can be disregarded without effect on the accuracy of the meter as a practical matter.

Considering an annular portion of flow across the meter at distance $r_x$ from the axis of rotation, of width $dr_x$ and unit axial length, the pressure P must then increase to balance the centrifugal force, $\rho(2\pi r_x dr_x)\omega^2 r_x$, on the annulus, or in differential terms:

$$\omega^2 r_x dr_x = \frac{dP}{\rho} \quad (6)$$

which in terms of a known relation between density ($\rho$) and pressure (P) has the following approximate solution for the change of density, per unit of density due to centrifugal force:

$$(\rho_R-\rho_r)/\rho_r = C\left[\frac{\rho_r}{12^4}\cdot\frac{\omega^2 R^2}{2}\left(1-\left(\frac{r}{R}\right)^2\right)\right] \quad (7)$$

The respective mass densities at the outer radius R and inside radius r, where R and r are in inches, $\rho$ is in slugs per cubic foot $\omega$ is the constant angular velocity in radians per second and C has the following values depending upon the physical state of the substance and compression process assumed:

(a) For liquids.—$C=1/K$ where K is the "Bulk Modulus of Compression," in pounds per square inch.

(b) Isothermal gas compression.—$C=1/P_1$ where $P_1$ is the absolute pressure of the gas entering the meter, in pounds per square inch.

(c) Adiabatic gas compression.—$C=1/KP_1$ where K is the ratio of the specific heat of the substance, at constant pressure, to that at constant volume.

Applying the foregoing analysis to a practical case where 2R, for example, is 3½ inches and $\omega$ is 1200 r.p.m., gasoline would have a difference in density (between inner and outer radius of the metering section) of only .001 percent, while even a highly compressible medium like air, at atmospheric pressure, will show a density difference of only .015 percent.

Aside from the above calculations, it has been found on an experimental basis that the change of density per unit density of substance due to centrifugal force is in the order of only 1/100 of 1% or completely negligible.

*Measurement of energy*

In meter embodiments operating on the law of conservation of energy the same basic functional characteristics as already described above in conjunction with the momentum type meter are employed. Thus, for example, straightening vanes may be employed at the inlet of the meter to insure that the initial tangential velocity ($V_{T_1}$) of the fluid mass is zero and constant speed rotating blades employed to give all particles of the mass a known and constant tangential velocity ($V_{T_2}$). In this case, however, instead of measuring the momentum, the kinetic energy is measured. This energy is supplied to the fluid by the vanes and may be measured as it is supplied to or as it is removed from the fluid mass. However, since we are dealing with energy the impact losses inherent with changes in velocities of the fluid must be considered. This can best be explained by considering first a case where a particle of mass, m having an axial velocity $V_A$ and a tangential velocity $V_T$ enters between a pair of closely spaced stationary plates, the plates being long enough and close enough that the fluid leaves the plates with $V_T=0$ while the axial velocity $V_A$ remains constant.

On entering the plates, the mass particle has a kinetic energy, $$\frac{mV^2}{2} = \frac{mV_T^2}{2} + \frac{mV_A^2}{2}$$

where V is the composition of velocities $V_A$ and $V_T$ relative to the plates. Assuming a partially inelastic impact, the mass particle loses a part of its $$\frac{mV_T^2}{2}$$

at the first impact with one of the plates, rebounds with a certain tangential velocity smaller than its original $V_T$ and makes a second impact on the other blade or other mass particles. After the second impact, the tangential velocity of rebound is still smaller and inasmuch as, by definition, the exit tangential velocity is zero ($V_T=0$), the total loss of kinetic energy due to impacts is equal to $$\frac{mV_T^2}{2}$$

even when the particle is only partially inelastic. In other words the entire kinetic energy is killed just as in the case of a perfectly inelastic impact.

In the case such as exists in the hypothetical structure described, the fluid mass particle $m$, flowing through the inlet straightening vanes emerges with zero tangential velocity ($V_{T_1}=0$) and a definite axial velocity, $V_{A_1}$. The mass then has a kinetic energy equal to $$\frac{mV_{A_1}^2}{2}$$

and enters between the blades which are rotating at a constant angular velocity $\omega$ which will produce an effective constant tangential velocity $V_{T_2}=\omega \bar{r}$. Inasmuch as the interaction between the blades and the fluid is the same whether the blades have no tangential velocity and the fluid has an initial tangential velocity or whether the blades have a tangential velocity and the fluid has none, the total energy loss due to impacts will be the same, namely $$\frac{mV_T^2}{2}$$

where $V_T$ is the change in the tangential velocity of the mass. Since there are initial straightening vanes in the hypothetical structure described to reduce the initial tangential velocity to zero and moving vanes rotating at a velocity sufficient to give the mass a final tangential velocity of $V_{T_2}$, the mass enters the rotating vanes with a tangential velocity $V_{T_1}$ of zero and leaves the blades with a tangential velocity $V_{T_2}$ and therefore has an increased kinetic energy equal to $$\frac{mV_{T_2}^2}{2}$$

The total energy (W) to be supplied by the rotating vanes accordingly is equal to the energy loss due to impact losses which is dissipated as heat $$\frac{mV_{T_2}}{2}$$

plus the change in kinetic energy $$\frac{mV_{T_2}^2}{2}$$

or expressed mathematically $$W = \frac{mV_{T_2}^2}{2} + \frac{mV_{T_2}^2}{2} = mV_{T_2}^2 \qquad (8)$$

or, in terms of angular velocities, $$W = (\omega \bar{r})^2 m \qquad (9)$$

In the embodiments hereinafter disclosed, the energy is supplied by electromagnetic means and is measured in terms of the electrical energy supplied thereto as will hereinafter be described.

The basic form of meter according to the present invention embodies the underlying structural features common to all, that is, it provides means for effecting a change in velocity and means for measuring the quantities required to effect the change. It is not, however, classifiable as a momentum type or kinetic energy type meter because it lacks the refinements necessary to perform exclusively on either principle. It is, however, entirely operative and provides satisfactory results where highest accuracy is not essential.

*Basic meter structure*

Referring to Figure 1, meter 20 comprises a housing 22 made up of three basic structural units: an intermediate body section 24, an inlet end section 26 and an outlet end section 28. Body section 24 is generally cylindrical in form and has an external radial flange 30 at each end. The ends of body section 24 are partially closed by means of annular plates 32 and 34 formed integrally on respective ends of inlet and outlet sections 26 and 28 and secured to body section flanges 30 by nut and bolt assemblies 36. End sections 26 and 28 contain through bores 38 and 40, respectively, which are coaxially aligned with the substantially larger internal bore 42 of body section 24. The inner faces 44 of plates 32 and 34 are preferably provided with annular pilot bosses 46 which are a snug fit in bore 42 and facilitate assembly of the housing sections 24, 26 and 28 with their respective bores 42, 38 and 40 in proper coaxial alignment.

Meter housing 22 is interposed and connected in coaxial flow relation between flow conduit sections 48 and 49 by any suitable means such as coupling flanges 50 formed on the ends of the conduit and housing end sections 26 and secured together by nut and bolt assemblies 52. Thus installed the fluid flow through meter 20 is from left to right in Figure 1 as indicated by arrows 54. The fluid entering the meter is divested of any incidental rotational component by means of a plurality of straightening vanes 56 fixedly disposed within bore 38 of housing section 26 in radial planes. The straightening vanes 56 extend the entire length of entrance section bore 38.

The inner edges of straightening vanes 56 are fixed in and support in coaxial relation with bore 38 a substantially cylindrical boss 58 having its upstream end 60 suitably faired or streamlined so as to reduce head losses. A much shorter but otherwise similar boss 62 is mounted in outlet section bore 40 in coaxial alignment with the bore and with boss 58 by a number of equiangularly spaced radial struts 64. The downstream end of boss 62 is also faired or streamlined to minimize turbulence or eddy currents introduced in the flow leaving the meter. The inner or unfaired ends of bosses 58 and 62 terminate flush with respective surfaces 44 of end plates 32 and 34 and are provided with suitable anti-friction bearings 66 which rotatably support the reduced ends 68 of a cylindrical rotor hub 70. As is clearly shown in Figure 1 bosses 58 and 62 and rotor hub 70 are coaxially aligned and of the same diameter so as to define the inner boundary of a substantially continuous annular flow path extending straight through the entire meter, thus keeping pressure drop therethrough at a minimum.

Within body section 24 of meter housing 22 the outer periphery of this flow passage is defined by a cylindrical sleeve 72 having an inner diameter equal to end section bores 38 and 40. Sleeve 72 is mounted for coaxial rotation on hub 70 by means of a number of preferably equiangularly spaced radial blades 74 having their inner and outer edges suitably fixed to the hub and sleeve, respectively. Hub 70, sleeve 72, and blades 74, hereinafter referred to as the impeller assembly 75, are coextensive in length, being slightly shorter than the internal axial dimension of housing section 24 so that a small amount of running clearance 76 is provided between end plate surfaces 44 and the respective ends of the sleeve 72. As will be apparent from the general explanation of the basic operating principles of the meter hereinabove, blades 74 serve to impart the requisite velocity change to fluid passing through the meter, and therefore they must be sufficient in number and axial length to insure the angular acceleration of all mass elements of the flow to the velocity of the blades themselves. In practice this means that at a radial distance $r_x$, the following relation must exist between axial blade length (L), circumferential blade spacing (S), maximum average axial flow velocity ($V_A$) and tangential blade velocity $\omega r_x$:

$$\frac{L}{S} > \frac{V_A}{\omega r_x}$$

It will be understood that with less dense, compressible fluids such as gases, the blades would have to be longer and more closely spaced than when handling liquids, in order to insure that all elemental particles of the fluid acquire the angular velocity of the blades before exiting therefrom.

Impeller assembly 75 is rotated at a constant predetermined speed by means of a reluctance type synchronous motor consisting of a rotor element 78 concentrically mounted on sleeve 72 substantially mid-way between its ends, and an armature or stator 80 mounted within the bore 42 of housing body section 22. Radially outward of rotatable sleeve 72 and closely, concentrically surrounding it, body section 22 is provided with a stationary thin-wall sleeve 82 of non-magnetic, low conductivity material permitting the efficient magnetic cooperation of the rotor 78 and armature 80. Sleeve 82 is stationary having its ends sealingly disposed in respective, coaxially aligned grooves 84, formed in end plate surfaces 44 and containing resilient O-rings 86 or like sealing means. In this manner, fluid passing through the meter is confined therein without the need for running seals between the adjacent ends of rotor sleeve 72 and bores 38 and 40.

In order to keep the air gap between rotor 78 and armature 80 a minimum, sleeve 82 is preferably made as thin as possible, being just thick enough to permit normal handling during manufacture and installation without permanent distortion. The thickness of this sleeve is exaggerated in the drawings to clarify and facilitate its illustration. The annular chamber 85 defined between sleeve 82 and bore 42 is completely filled with a substantially incompressible inert fluid such as mineral oil which serves to "back up" or reinforce the sleeve, thus enabling it to withstand the pressures exerted on its inner walls by the fluid being metered, which metered fluid is frequently under pressures as high as 1000 pounds per square inch or higher. The chemical identity of the fluid in chamber 85 is not critical; its essential characteristic, aside from the inherent incompressibility of fluids, is that it does not have any deleterious effect on armature windings 80.

As is well known the rotational speed of synchronous motors is a function of the alternating current frequency and the number of poles, which factors are therefore taken into consideration in order to obtain a desired rotational speed of rotor 78 and the impeller assembly 75 driven thereby.

From structure thus far described it will be understood that the impeller assembly 75 comprising hub 70, blades 74 and sleeve 72 is rotated as a unit at a constant predetermined angular velocity by motor 78, 80. Fluid enters inlet bore 38 from conduit section 48, passing through straightening vanes 56 which render the flow completely axial in character ($V_{T_1}=0$) for all practical purposes. Except for an initial quantity which fills the space between sleeves 72 and 82, all fluid then passes through rotating blades 74 which impart their angular velocity to each particle thereof, so that the fluid leaving the blades has known and constant tangential velocity $V_{T_2}$, or momentum $mV_{T_2}$ or kinetic energy $$\frac{mV_{T_2}^2}{2}$$

Flow leaving the rotating blades enters outlet end section 28, passing over the faired exit boss 62 with a minimum of disturbance and continues through conduit section 49.

The kinetic energy or momentum of the fluid is supplied by motor 78, 80. By inserting the proper electrical measuring instruments, hereinafter described, the quantity furnished to the motor should theoretically be a measure of $$\frac{mV_{T_2}^2}{2}$$

or $mV_{T_2}$ as desired but, in practice, the supply to the motor exceeds the kinetic energy $$\frac{mV_{T_2}^2}{2}$$

imparted to the fluid and impact losses $$\frac{mV_{T_2}}{2}$$

by what will be called "secondary losses" required for example, to overcome bearing friction, dissipated as turbulence in the fluid and/or in heating windings of stator 80. These factors result in errors in the readings of the meter and, particularly at low flows, a non-linear relation between the supply to motor 78, 80 and the momentum or kinetic energy of the fluid. Consequently, the meter shown in Figures 1–3 does not fall exclusively in either the momentum or kinetic energy type categories but merely illustrates the basic structural and functional characteristics which underlie the embodiments hereinafter described.

According to the present invention, input to motor 78, 80 is supplied and measured directly in its electrical form, in the following manner. Referring to Figure 4, M diagrammatically represents motor 78, 80 in an electrical circuit 87 which connects it to a suitable source of alternating current at constant voltage.

Circuit 87 is provided with a compensated watt-hour meter 88 having a current coil 89, a potential coil 90 and voltage and current compensating windings 91 and 92. In the well known manner, a conventional watt-hour meter 88 measures the supply to the fluid by motor M plus the losses mentioned above, which losses are completely eliminated in the forms of meters presently to be described, which are actual examples of the momentum and energy types.

It is pointed out that the supply required to effect the velocity change in the fluid is thus measured directly in its electrical form with no need for conversion or amplification of analog signals produced in response to deflection of a limited rotaton indicator or the like.

Energy type flow-mass meter

An exemplary embodiment of an energy type meter according to the present invention is shown in Figure 5 wherein like reference numerals indicate parts in common with the first embodiment. As will clearly be seen from this figure, this form of invention is similar to that shown in Figure 1 except that the axial dimension of body section 122 has been substantially doubled in order to permit the installation therein of two complete duplicate impeller assemblies 75 and 175, in tandem coaxial relation to each other, as well as two complete and mechanically independent synchronous motors 78, 80 and 178, 180. The hubs 70 and 170 of the impeller assemblies are mounted by spaced anti-friction bearings 66 for independent rotation on a fixed, unitary shaft 168 extending coaxially through the meter body section 122 and having its ends fixed in faired bosses 158 and 162.

In this embodiment, the outlet end section 128 is of the same length as the inlet end section 26 and is provided with straightening vanes 156 like 56 of the inlet end section so that the same fluid flow conditions exist as fluid passes from straightening vanes 56 to blades 74 and as fluid passes from blades 174 to vanes 156, for a purpose hereinafter explained.

Motors 78, 80 and 178, 180 and, therefore, the blade assemblies 75 and 175 driven thereby are rotated at the same speed, being electrically and mechanically identical and interconnected to the same three phase power supply as shown in the wiring diagram of Figure 6, wherein the first or upstream motor 78, 80 is designated as $M_1$ and the downstream "parasite motor" as $M_2$. In operation, fluid entering the upstream set of blades 74 from vanes 56 is flowing substantially axially ($V_{T_1}=0$) and acquires the same tangential velocity $V_{T_2}$ as possessed by the blades and therefore has a kinetic energy $$\frac{mV^2_{T_2}}{2}$$

as a result of the work done by the upstream motor $M_1$. The electrical energy supplied to motor $M_1$ is, however, greater than the kinetic energy of the fluid $$\frac{mV^2_{T_2}}{2}$$

and impart loss $$\frac{mV^2_{T_2}}{2}$$

by the "secondary losses" as defined above. By the time the fluid enters the second set of blades 174 it already possesses the same tangential velocity as the blades ($V_{T_2}$) and therefore the energy required by motor $M_2$ is only that necessary to overcome the secondary losses which, because of the construction and arrangement of parts described, are identical to the secondary losses associated with blades 74 and motor $M_1$. Therefore, the difference in the energy drawn by the two motors is equal to the kinetic energy $$\frac{mV^2_{T_2}}{2}$$

imparted to the fluid and the impact loss $$\frac{mV^2_{T_2}}{2}$$

which, in turn, is a measure of the mass flowing through the meter. Measurement of this net energy is accomplished by means of the electrical circuit shown diagrammatically in Figure 6.

As shown in Figure 6, the meter motor $M_1$ and parasite motor $M_2$ are connected in parallel to the same three phase power supply by a circuit comprising three basic components: a difference forming circuit 182, a compensating circuit 184 and a watt-hour meter 186. The watt-hour meter 186 may be the conventional aluminum disc induction type having two current coils 188 and 190 and two potential coils 192 and 194. One current coil 188 is connected in series with the secondary windings of a first pair of current transformers $T_1$ and $T_2$ having their primary windings connected between the Phase A line and Phase A windings of motors $M_1$ and $M_2$ respectively. The other current coil 190 is connected in series with the secondary windings of a second pair of current transformers $T_3$ and $T_4$ which have their primary windings connected between the Phase C line and the Phase C windings of motors $M_1$ and $M_2$, respectively. The potential coils of the watt-hour meter are connected across the AB and AC phase windings of motor $M_1$. If the secondary windings of the current transformer in both Phase A and Phase C are connected together in additive relationship, the sum of the energies drawn by both motors would be metered. By reversing the polarity of the secondary windings of the transformers $T_1$ and $T_4$ in series with the parasite motor $M_2$, the difference between the energies drawn by the two motors is measured by watt-hour meter 186. However without further refinement, this meter reading would include the difference of copper loss of the two motors. To compensate for the difference in the resistance or copper loss of the motor windings due to the different currents flowing in the two motors, three sum current transformers $T_5$, $T_6$ and $T_7$ are provided in the circuit each having its primary coil connected in series in one of the respective power lines and its secondary in series with the potential coils of the watt-hour meters. Compensating resistors $R_a$, $R_b$ and $R_c$ are shunt-connected across the respective secondaries of transformers $T_5$, $T_6$ and $T_7$.

The compensating resistor $R_a$ is equal in value to the product of the transformer $T_5$ and the phase resistance (line A to neutral resistance) of either motor. The values of $R_b$ and $R_c$ are similarly determined by their respective circuits.

The circuit functions as follows: the sum currents through the primaries of current transformers $T_5$, $T_6$ and $T_7$ cause a proportional current flow through the resistance $R_a$, $R_b$ and $R_c$. The resultant voltage across a resistance is then equivalent to the product of the sum current and the motor phase resistance. The vectorial sum of the voltages across AB, $R_a$ and $R_b$ is impressed on potential coil 192. Likewise, the sum of the voltages across AC, $R_a$ and $R_c$ is impressed on potential coil 194.

The energy measured by the watt-hour meter is then the difference in energy supplied to the two motors less the sum of the copper looses of both motors. Therefore, for identical motors the energy measured is the difference in work done on the fluid by the motors and thus directly and fundamentally proportional to mass flow passed by the meter. The voltage across the AB and AC watt-hour meter 186 which integrates the power (voltage × current) with respect to time as shown by the following mathematical analysis:

$$W=\int_0^t \sqrt{3}\,EI \cos\theta\, dt \qquad (10)$$

where $W$=work
$E$=voltage across potential coils of watt-hour meter
$I$=current in current coils of watt-hour meter
$\theta$=phase angle between E and I Repeating Equation 9

$$W=(\omega\bar{r})^2 m$$

and therefore $$(\omega\bar{r})^2 m = \int_0^t \sqrt{3}\,EI \cos\theta\, dt \qquad (11)$$

$$m = \int_0^t \frac{\sqrt{3}\,EI \cos\theta\, dt}{(\omega\bar{r})^2} \qquad (12)$$

If mass rate rather than total mass measurements are desired, the watt-hour meter is replaced by a watt meter connected in the same manner as the above watt-hour meter to measure the difference in net power flow to the two motors $M_1$ and $M_2$.

*Momentum type flow-mass meter*

A third embodiment of the invention is an example of a momentum type meter and takes the form shown in Figure 7, comprising a meter housing 222 made up of a cylindrical body section 224, an inlet end section 226 and an outlet end section 228, secured together by means of a plurality of threaded fasteners 236. Inlet and outlet end sections 226 and 228 contain through bores 238 and 240, respectively, coaxially aligned with respect to each other and a larger diameter bore 242 in body section 222. The meter 220 is installed in flow relation between sections 248 and 249 of a fluid flow conduit as by means of cooperating threaded connections 250 and 252 so that fluid enters the meter as indicated by arrows 254.

A faired boss 258 mounted in coaxial relation to and within bore 238 by means of a plurality of equiangularly spaced radial struts 263, supports the upstream end of a fixed shaft 268 having its downstream end supported in a similar boss 262 coaxially mounted in the downstream end of outlet section bore 240 by spaced radial struts 264.

As in the previously described embodiments a synchronous motor comprising armature 280 and rotor 278 and a sleeve 282 are fixedly mounted within body section 224 and an impeller assembly 275 consisting of a sleeve 272, blades 274, and hub 270 are rotatably mounted adjacent the upstream end of shaft 268 by spaced anti-friction bearings 266.

Spaced downstream of impeller assembly 275, a cylindrical hub 277 equal in diameter to hub 270 is rotatably mounted on shaft 268 by spaced anti-friction bearings 267 and carries a plurality of preferably but not necessarily equiangularly spaced radial blades 279, the outer ends of which have a close running clearance with bore 240. Intermediate hubs 270 and 277, shaft 268 is formed with a cylindrical enlargement 281 equal in diameter to said hubs and of an axial length in the order of the axial length of blades 274, thus forming a smooth walled annular "de-clutching" space 283 which eliminates the hydraulic clutching effect which would occur if blades 274 and 279 were adjacent to each other.

As best seen in Figures 8 and 9, the portion of shaft 268 extending through hub 277 is provided with a pair of diametrically opposite, fixed electromagnetic poles 284 taking the form of axial ribs on the periphery of the shaft and adapted to magnetically coact with a second, movable pair of electromagnetic poles 286 taking the form of diametrically opposed axial ribs on the interior walls of hub 277.

Poles 284 and 286 are energized by means of a suitable winding connected to an electrical circuit, hereinafter described, by means of wires 288 extending through suitable bores 290 and 292 in shaft 268 and one of the struts 264 to the exterior of housing section 228. Wires 288 are sufficiently slack and flexible to permit limited rocking movement of poles 286. Fixed and movable poles 284 and 286 jointly constitute a force balance limiting the rotation of bladed hub member 277 as will presently appear.

Before continuing with the description of this meter embodiment, the force balancing function of fixed and movable poles 284 and 286 will be discussed with regard to the operation of the meter.

As has been previously explained hereinabove, in measuring momentum of the fluid mass at the output of the meter, the tangential velocity previously imparted to the fluid is reduced to zero. Initially the fluid has a tangential momentum $mV_{T_1}$ and therefore an impulse equal to $mV_{T_1}$ must be exerted to reduce $V_{T_1}$ to zero. The force necessary is instantaneously equal to $d(mV_{T_1})/dt$ but while $V_{T_1}$ is constant by definition, $dm/dt$ is variable and therefore, in a continuous process, $d(mV_{T_1})/dt$ and the opposing forces are both likewise variable. The present invention employs a null type force balance which provides a force which is at all times exactly equal and opposite to $d(mV_{T_1})/dt$ with but slight displacement of the force balancing members. Broadly this is accomplished by creating the balance force electromagnetically and providing means for varying the electromagnetic force in direct proportion to the time rate of change of momentum of the metered fluid at any given instant so that the total electromagnetic impulse is a measure of the mass of the fluid passed by the meter.

Specific forms of the force balance are hereinafter described in detail.

A portion of the periphery of housing end section 228 surrounding bladed hub 277 is provided with a recess 293 containing a carbon pile 294 at one side and occupying a fractional portion of the circumferential dimension of the recess. A follower magnet 295 is disposed for circumferential or tangential movement in the remainder of recess 293 and is positioned therein by means of a control magnet 296 on the outer edge of one of the blades 279. Magnet 295 and carbon pile 294 jointly comprise a position responsive transducer and effective rotor detent 297.

In this form of the invention, motor 278, 280 is supplied with unmetered power to rotate impeller assembly 275 at a predetermined speed. The fluid entering the vanes acquires therefrom a predetermined constant angular velocity. The rotating fluid leaving vanes 274 passes through annular "declutching" space 283 substantially without head loss, and into blades 279, which the fluid tends to drive in the same direction as impeller assembly 275 (clockwise as viewed in Figure 8). Rotation of blades 279 and hub 277 is however, electromagnetically resisted as will presently be seen and, therefore, the blades reduce the tangential velocity of the fluid to zero, for all practical purposes. Thus the angular momentum goes from $mV_{T_1}$ to $mV_{T_2}$ and since $mV_{T_2}=0$, the change in momentum $(mV_{T_1}-mV_{T_2})$ is equal to $mV_{T_1}$. Therefore, the impulse exerted by blades 279 on the fluid is a measure of its momentum and since $V_{T_1}$ is constant by definition, the electromagnetic balancing impulse, measured in the manner now to be described, is a direct measure of the mass flow through the meter.

In one form of the invention shown in Figure 9, windings of movable poles 286 on blades hub member 277 are connected in series with one coil 255 of a watt-hour meter 257 and across a source of A.C. or D.C. power, a suitable resistor 259 being shunt-connected across said coil. The windings of the fixed poles 284 on shaft 268 are connected in series with the carbon pile 294 of position sensing transducer 297 and the other coil 261 of the watt-hour meter across the same or suitable other power source.

The circuit is balanced so that, with zero mass flow through the meter and, therefore, zero tangential momentum of the fluid acting on bladed member 277, the bladed member assumes an initial position such as shown in Figures 8 and 9, wherein the follower magnet 295 barely abuts or exerts a predetermined pressure on carbon pile 294 whereby the impedance thereof is a predetermined maximum so that the current in the circuit and windings is essentially zero. The watt-hour meter 257 is calibrated to account for any minimum current. In this condition, the current flowing through the windings renders poles 284 and 286 attractive so that the bladed member 277 is electromagnetically held in its zero flow position.

As fluid flow increases, the tangential force exerted thereby on blades 279 increases with the result that hub 277 tends to rotate clockwise (Figure 8). Consequently, follower magnet 295 under the influence of control magnet 296 tends to compress and thereby decrease the resistance of carbon pile 294. The reduced resistance permits immediately an increased flow of current through the windings of poles 284 thus increasing the electromagnetic restoring force. Conversely, too much electromagnetic restoring force will cause the follower magnet 294 to unload and thereby increase the resistance of the carbon pile 294 and reduce the current flow. In this manner, a force balance is achieved wherein with but slight displacement of bladed member 277 the angular momentum $(mV_{T_1})$ of the fluid mass is electrically balanced. Other types of force balance may be used. For example, contacts in series with one or windings on the electrical machine may operate on a time sharing basis. One contact may be mounted on bladed member 277 or an extension thereof and the other contact mounted in any convenient location on a fixed member. To avoid possible ignition of a combustible fluid, a sleeve rotatably mounted inside end section 288 may be attached to one or more blades and the contacts may then be mounted outside of the sleeve in a pocket in end section 288. Alternatively, an arm of a potentiometer connected to the bladed member 277 and a servomechanism may also be used to provide the position restoring force.

In these forms of force balance, the tangential force required to actuate the position transducer is less than the restoring tangential force by a ratio of less than that of the mass indication error to the fluid mass which is metered. In other words, the frictional force required to be overcome by the fluid mass being measured to actuate the position transducer is less than the restoring tangential force of the force balance by a ratio less than the ratio of the mass indication error to the fluid mass being metered.

In all the above mentioned schemes, electromagnetic torques are caused to occur in a manner well known to the art. Motion is restricted to a few degrees of arc. The force balance is thus similar in principle to the d'Arsonval galvanometer and the electrodynamic or dynamometer meter. The electrodynamic type in particular is similar to the force balance in embodiments illustrated in Figures 7 through 10 in that the force over a limited range of a few degrees of deflection is strictly proportional to the product of the currents in its two windings.

The electrical quantity required to provide the restoring impulse necessary to oppose the fluid momentum and effect the balance in any of these current balances is the time integral of the mean product of the current in coils 255 and 261 which value is fundamentally and precisely proportional to the impulse of the mass flowing through the meter. Since the change in velocity remains constant for all rates of mass flow as explained above, the time integral of the product of the currents in coils 255 and 261 is directly proportional to the mass flow.

If D.C. power is used, watt-hour meter 257 may be a conventional D.C. watt-hour meter which is readily modified to be an impulse meter by making both windings low resistance or current windings and connecting one in series with each circuit. If A.C. power is used, the conventional induction type watt-hour meter is similarly modified to be an impulse meter by changing the high resistance voltage coil to a low resistance current coil and eliminating the phase shifting coil. In either case, instead of deriving a current proportional to the voltage by using a high resistance coil connected across the input power line, the high resistance coil is replaced by a low resistance current coil so that the watt-hour meter integrates the product of the two currents through coils 284 and 286 rather than a product of a current and a voltage. The time integral of the product of these two currents is a direct measurement of the impulse and, since the velocity term is constant, the modified watt-hour meter may be calibrated directly in units of mass.

No auxiliary integrating or amplifying equipment is required and substantially no variable electrical losses are metered. With no mass flow the electrical currents in coils 284 and 286 will be due only to magnetization current permitted by the maximum resistance of the electrical circuit including carbon pile 294 and coils 284 and 286. This "no-mass flow" current remains as a fixed component of the total current as the mass flow changes over a large range and consequently can be readily eliminated by calibration from the output. Since the impulse meter does not measure power, the copper and core losses of electromagnetic machine are not included in the output of the impulse meter and since the electromagnetic machine is stationary, there is no drag or friction loss. It is therefore apparent that this embodiment is peculiarly adapted to permit the use of an extremely efficient metering system which inherently omits the losses otherwise encountered.

In another form of force balance shown in Figure 10, mass flow is measured by means of an electrical circuit in which the windings of both fixed poles 284 and movable poles 286 and carbon pile 294 are series connected to a source of either A.C. or D.C. power. In this form of circuit, the mean square of the current flowing in the winding of both pairs of poles 284 and 286 is measured by a suitably calibrated amperes squared electrical instrument 299 and is precisely and fundamentally proportional to the mass rate as distinguished from the total mass of fluid flow. The total mass flow of fluid is proportional to the time integral of the current squared which may be obtained by use of an impulse meter of either the D.C. or A.C. type as described above. Since there is only one circuit the two current coils of the impulse meter are connected in series. Either electrical measurement, that is, the mass rate indicator or the total mass indicator is made with inexpensive and extremely accurate commercially available instruments only slightly modified, the currents in the coils being of a magnitude that can be measured without amplification.

A modified form of meter construction, shown in Figures 11, 12 and 13 is particularly suited to use when the flow mass meter is to be installed in small diameter conduits. Figure 11 illustrates only the inlet half of a meter of the type shown in Figure 7 constructed according to the present modification. It will be understood however, that the form of construction is applicable to all meter embodiments disclosed with obvious modifications to conform it to the particular meter and that, within the limits allowed by such conforming modifications the other half of the meter is similar in structure to the portion illustrated.

This form of meter comprises a housing 320 made up of a tubular body section 322 having an internal bore 342 and an inlet end plate 326 containing a through bore 338 of smaller diameter than bore 342. End plate 326 is secured to body section 322 with their respective bores in coaxial alignment as by means of cooperating threads 336. A thin walled, cylindrical sleeve 382 formed of low-conductivity, non-magnetic material and having an internal bore 383 of exactly the same diameter as bore 338 is mounted coaxially within body section 322, having its end sealingly disposed in a suitable recess in end plate 326 so that bores 338 and 383 form a smooth-walled continuous flow passage. An O-ring or like packing means 384 effectively seals the end of sleeve 382 in end plate 326.

In the annular compartment 330 defined between the outer wall of sleeve 382 and bore 342, an armature 380 of a constant speed synchronous motor is coaxially mounted in closely surrounding relation to the sleeve. As in the previously described embodiment, the annular compartment is filled with inert fluid in order to enable sleeve 382 to withstand high internal pressures.

A faired boss 358, coaxially mounted in the inlet end of the flow passage defined by bores 338 and 383 by a plurality of radial struts 364 supports one end of a fixed shaft 368 extending coaxially through the flow passage and having its other end (not shown) similarly supported adjacent the outlet end of the meter.

Freely rotatably mounted on shaft 368 by a plurality of spaced anti-friction bearings (one shown at 366) is a rotor 378 of a constant speed synchronous motor having its armature 380 coaxially mounted in closely surrounding relation on sleeve 382. Rotor 378 has a cylindrical hub portion 370 of the same external diameter as the large diameter of the inner end portion of boss 358 so that the boss and hub jointly form a streamlined core or inner boundary for fluid flow entering the meter through bore 338 as indicated by arrows 354. Minimum running clearance is provided between the adjacent portions of hub 370 and boss 358.

In this form of flow mass meter construction, the blades for effecting the velocity change are the radial poles 374, of rotor 378, the pole spaces 376 therebetween accommodating the flow of fluid passing through the meter. In order to keep head losses to a minimum, the frontal portions of poles 374 are faired or streamlined as shown in Figure 13. The trailing portions (not shown) of the poles are preferably similarly faired to prevent introduction of turbulence in flow leaving the meter.

Because the physical size of anti-friction bearings utilized in mounting the rotating meter element cannot be decreased indefinitely in proportion to pipe line diameter, without increasing the effective friction coefficient thereof, this form of construction is particularly advantageous for use in small diameter conduits and/or where space limitations exist. The operation of the meter is the same as that of the particular embodiment of the invention to which this structural modification is applied.

From the foregoing description of certain preferred embodiments of the present invention it will be appreciated that the meters disclosed measure the mass rate or total mass flow of any fluid material whether gaseous, liquid, or granular and regardless of the degree of homogeneity. Meters according to the present invention provide accuracies of ±0.1 to 0.2%, due to the high accuracy with which the changes in momentum and kinetic energy are electrically translated into readings of mass flow through the meter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flow mass meter comprising, in combination, means defining a linear fluid flow passage, rotatable means in said flow passage adapted to impart angular velocity to all fluid flowing therethrough, second rotatable means in said flow passage downstream of said one rotatable means and adapted to maintain said angular velocity, individual electromagnetic means for independently driving each of said rotatable means at the same constant angular velocity, an electrical circuit connecting said electromagnetic means to a source of electrical energy, and means in said circuit for measuring the difference in net electrical energy drawn from said source by said electromagnetic means for imparting angular velocity to the fluid.

2. In combination, means defining a rectilinear flow passage; spaced flow guide means in said flow passage adapted to constrain fluid flow therethrough to a purely rectilinear, non-rotational flow path; a pair of identical impeller means independently mounted in said flow passage between said guide means and adjacent each other for rotation about the axis of said flow passage, said impeller means being so constructed that all elements of fluid flow passing therethrough are rotated at the same angular velocity as said impeller; constant speed electric motors individual to each of said impeller means and operable to rotate said impellers at the same constant angular velocity, whereby the first of said impeller means relative to the direction of flow through said passage imparts its angular velocity to the flow therein and the other impeller means maintains the angular velocity of the flow therein; an electrical circuit interconnecting said motors in parallel to a source of electricity, and electric energy metering means in said circuit for measuring the difference in the quantity of electrical energy required to drive said motors.

3. The combination defined in claim 2, wherein said electrical energy metering means comprises a watt-hour meter for integrating the product of the difference of currents through each of said motors and voltage drop across at least one of said motors with respect to time and said circuit includes means for effecting cancellation of the portion of said electrical energy absorbed by the internal resistance of said motors.

4. A meter for measuring the mass of fluids flowing in conduits comprising, in combination, a housing; means defining a continuous, linear flow passage through said housing; means in said flow passage for establishing substantially axial non-rotational flow at the inlet and outlet ends thereof; mechanically independent fluid impeller means in tandem relation in said flow passage between the inlet and outlet ends thereof each adapted to impart angular velocity uniformly to all elements of fluid flow passing through said passage; a separate constant speed synchronous motor for driving each said impellers at a constant angular velocity whereby the first impeller with respect to the direction of flow imparts angular velocity to flow in said passage and the other impeller maintains said angular velocity; an electrical circuit connecting said motors in parallel to a constant voltage source of alternating current; means in said circuit for electrically obtaining a current proportional to the difference between the current supplied to the motor driving said second impeller and the current supplied to the motor driving said first impeller; a watt hour meter in said circuit for integrating with respect to time the product of the voltage and the current proportional to the difference in said currents; and compensating means in said circuit for effecting cancellation of copper loss caused by the internal resistance of said motors.

5. A flow meter including in combination a housing having spaced inlet and outlet ports for connection into a conduit adapted to carry a flowable mass to be metered, a passageway having a generally straight axis in said housing, a first impellor in said passageway for imparting to the mass a velocity having a sense independent of the mass flow rate through said passageway, a second impellor downstream of said first impellor in said passageway for retaining the mass at the same velocity independent of the mass flow rate, first and second electrically powered means for driving said first and second impellors, and means measuring the difference between the electrical input to said first and second electrically powered means to produce an indication fundamentally directly proportional to mass flow.

6. The flow meter defined in claim 5 wherein the first and second impellors are substantially identical and further containing means in the flow path upstream of said first impellor and downstream of said second impellor to produce identical velocity magnitudes in the said sense independent of the mass flow rate.

7. A flow meter having a generally straight longitudinal axis and walls surrounding said axis defining a fluid flow passageway for material along said axis, a first electromagnetically operated means cooperating with said walls for effecting a known change in a component of velocity independent of the velocity along said longitudinal axis of all the particles of said material, a second independent and substantially identical electromagnetically operated means downstream in said passageway for retaining the particles of said material at the same final velocity as effected by said velocity change, a three-phase alternating current electrical circuit for energizing said electromagnetically operated means, electrical metering means in said electrical circuit for providing an indication which is a function of an electrical parameter fundamentally equal to the time integral of the mass flow rate, and circuit means interconnecting the electrical circuit to said two electromagnetically operated means and said electrical metering means to subtract the power utilized by said second electromagnetically operated means from the power utilized by said first electromagnetically operated means to thereby produce a direct highly accurate reading of total mass flow of said material over widely varying mass flow rates.

8. A flow meter comprising a housing containing spaced inlet and outlet flow passages connected by a mass flow channel, first and second sets of radially and axially extending vanes spaced along said channel in the direction of mass flow between said inlet and outlet passages, a first electromagnetically operated means for driving said first set of vanes at a constant angular velocity, a second electromagnetically operated means for independently driving said second set of vanes at the same angular velocity, and a circuit means including electrical current indicator means connected to both of said electromagnetic means so as to subtract the driving and fluid friction losses from the indication of said electrical current indicator means to measure and indicate an electrical quantity fundamentally proportional to the mass of a substance passing through the flow meter.

9. A flow meter comprising a housing containing spaced inlet and outlet flow passages connected by a mass flow channel, first and second sets of radially and axially extending vanes spaced in tandem relation along said channel in the direction of mass flow between said inlet and outlet passages, a first constant speed motor for driving said first set of vanes at a constant angular velocity, a second constant speed motor for driving said second set of vanes at the same angular velocity, said first motor being sufficiently energized to impart said angular velocity and overcome mechanical and fluid friction, said second motor being sufficiently energized to overcome only said mechanical and fluid friction, and a circuit means including electrical current indicator means connected to measure the difference in electrical input required for energizing said motors to measure and indicate an electrical quantity fundamentally proportional to the mass of a substance passing through the flow meter.

References Cited in the file of this patent

UNITED STATES PATENTS

| | | |
|---|---|---|
| 1,347,732 | Cooper | July 27, 1920 |
| 2,299,406 | Potter | Oct. 20, 1942 |
| 2,537,310 | Lapp | Jan. 9, 1951 |
| 2,591,478 | Turner | Apr. 1, 1952 |
| 2,602,330 | Kollsman | July 8, 1952 |
| 2,612,777 | Greer | Oct. 7, 1952 |
| 2,697,986 | Meagher | Dec. 28, 1954 |
| 2,714,310 | Jennings | Aug. 2, 1955 |

FOREIGN PATENTS

| | | |
|---|---|---|
| 8,097 | France | Nov. 5, 1907 |
| 242,038 | Germany | Dec. 19, 1911 |

OTHER REFERENCES

A publication, General Electric Review, vol. 33, No. 12, December 1930, pages 684–689.